No. 800,128. PATENTED SEPT. 19, 1905.
W. GARDINER.
GRID OR ELEMENT FOR SECONDARY BATTERIES.
APPLICATION FILED AUG. 22, 1904.
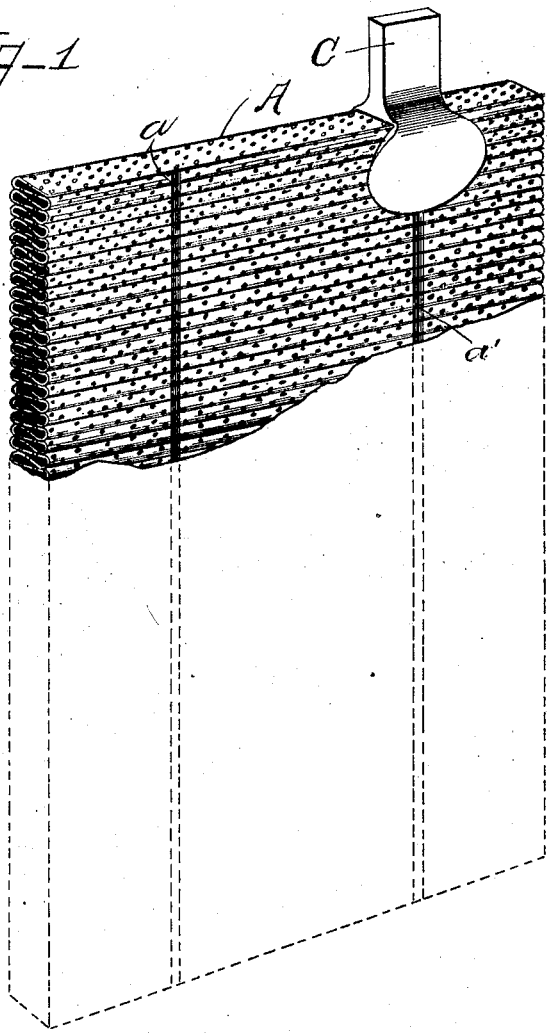
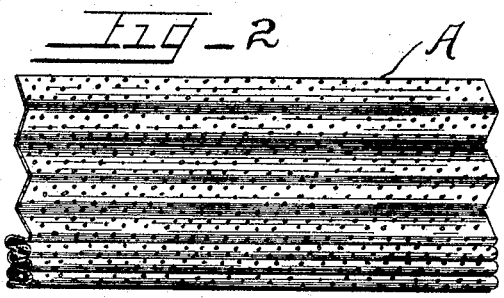
Witnesses
J. W. Angell.
Hjalmar S. Rudd.
Inventor
William Gardiner.
by Charles W. Hills, Atty.

UNITED STATES PATENT OFFICE.

WILLIAM GARDINER, OF CHICAGO, ILLINOIS, ASSIGNOR, BY MESNE ASSIGNMENTS, TO UNIVERSAL ELECTRIC STORAGE BATTERY COMPANY, A CORPORATION OF DELAWARE.

GRID OR ELEMENT FOR SECONDARY BATTERIES.

No. 800,128.       Specification of Letters Patent.       Patented Sept. 19, 1905.

Application filed August 22, 1904. Serial No. 221,644.

*To all whom it may concern:*

Be it known that I, WILLIAM GARDINER, a citizen of the United States, and a resident of the city of Chicago, county of Cook, and State of Illinois, have invented certain new and useful Improvements in Grids or Elements for Secondary Batteries; and I do hereby declare that the following is a full, clear, and exact description of the same, reference being had to the accompanying drawings, and to the letters of reference therein, which form a part of this specification.

This invention relates to improvements in elements for secondary batteries and of the class known as "lead-plate" batteries. Heretofore a serious difficulty has existed in the use of pasted and other plates, owing to the fact that in charging and discharging the battery a greater or less degree of disintegration of the active material takes place, causing the same to be separated from the plate and to fall to the bottom of the cell. This in many instances accumulates in sufficient quantities to short-circuit the cell and seriously detracts from the efficiency of the cell.

The object of my invention is to provide an element or battery-plate so constructed as to retain the active material permanently in the plate, thus preventing the same falling therefrom. The construction of the plate also precludes the possibility of the active material being washed therefrom by the electrolyte by the jolting or jarring of the cells.

It is also an object of my invention to increase the surface of metal adapted to be exposed to electrolytic action to a maximum by the use of a minimum weight of the metal.

The invention consists in the matters hereinafter contained, and more fully pointed out and defined in the appended claims.

In the drawings, Figure 1 is a perspective view of a plate embodying my invention, showing the same broken away at the bottom. Fig. 2 is a similar perspective view showing the sheet forming the plate extended longitudinally of the plate or partly unfolded to show the construction.

As shown in said drawings, said plate A comprises a sheet of metal, such as relatively pure lead or other metal, which is rolled into very thin sheets and closely perforated, said perforations extending therethrough and, if preferred, being formed in the plate at the time the plate is rolled. When said plate has been reduced to a desired thickness and the perforations made therein by rolling or otherwise, the same is folded transversely, as shown in the drawings, into a plurality of folds, which may be of any desired width and the outer edges of which are forced close together, leaving the central portion of the fold curved outwardly, as shown in Fig. 1. A lug C is then burned on the top thereof near one side of the same, and the adjacent folds of the sheet on each side thereof are burned together at a plurality of points, as shown in Fig. 1. Said lines of lead-burning are indicated, respectively, by $a\ a'$. The plate is now ready to be formed and is preferably formed electrochemically by processes forming the subject-matter of other inventions or in any desired manner, but which as a final result reduces the surface of the sheet on both sides thereof and in the folds to a metallic oxid. In the process of converting a portion of the metal into an oxid the volume is greatly increased, thus greatly compressing the metallic oxid within the folds of the plate. The greater part of the oxid formed on the outer surfaces of the plate or grid is then scraped away to prevent the disintegration from the plate forming a short circuit, and the element is then ready for use.

The operation is as follows: The electrolyte finds ready access through said apertures and permeates every part of the element within the folds of which said oxid is secured. It is obvious that as a result the available surface for electrolytic action is enormously increased on both sides of the sheet and that the charging and discharging of the cell can have no effect whatever to cause buckling or the disintegration of the oxid from the element. It is also obvious that an element constructed as described may be made of comparatively little weight and that owing to the thinness of the same and the great surface exposed to electrolytic action the rate of charging or discharging may be much more rapid than ordinary without possibility of injury. Obviously, also, the thickness of said grid as a whole may be varied as desired by varying of the width of the folds, thus adapting the plate for use in any desired size or type of cell. While in the specification the element has been described as first folded or shaped and then formed, I do not desire to be limited to a grid so treated, as, obviously, a metallic sheet may be formed and the oxid converted into a metallic sponge previous to folding, if preferred.

Obviously details of construction may be varied without departing from the principles of my invention.

I claim as my invention—

1. An electrode for accumulators comprising a thin sheet of relatively pure lead provided with a plurality of closely-arranged apertures extending therethrough, said sheet being folded transversely thereof into a plurality of folds the walls of which are curved oppositely forming single pockets and the adjacent edges thereof being forced into close contact and integrally connected at a plurality of points intermediate the lateral edges of the sheet.

2. An electrode for accumulators comprising a thin sheet of relatively pure lead, provided with a plurality of closely-arranged apertures therethrough, said sheet being folded transversely into a plurality of folds, the central portions of adjacent folds being out of contact and the outer margins thereof forced close together and integrally connected at a plurality of vertical lines on opposite faces.

3. A sheet of thin pure sheet metal provided with a plurality of closely-arranged apertures extending therethrough, said sheet being folded transversely providing a plurality of folds having their margins forced into close contact and integrally connected together at a plurality of points intermediate the lateral edges of the sheet.

4. A plain sheet of thin pure sheet-lead provided with a plurality of closely-arranged apertures extending therethrough, said sheet being folded transversely into a plurality of single, closed pockets having the walls thereof out of contact and the adjacent edges thereof brought into close contact and burned together at a plurality of points along the faces of the sheet.

In testimony whereof I have hereunto subscribed my name in the presence of two subscribing witnesses.

WILLIAM GARDINER.

Witnesses:
HJALMAR S. RUDD,
W. W. WITHENBURY.